Aug. 10, 1954
C. H. BERGQUIST
2,686,065
ARMORED CABLE CLAMP
Filed Feb. 29, 1952
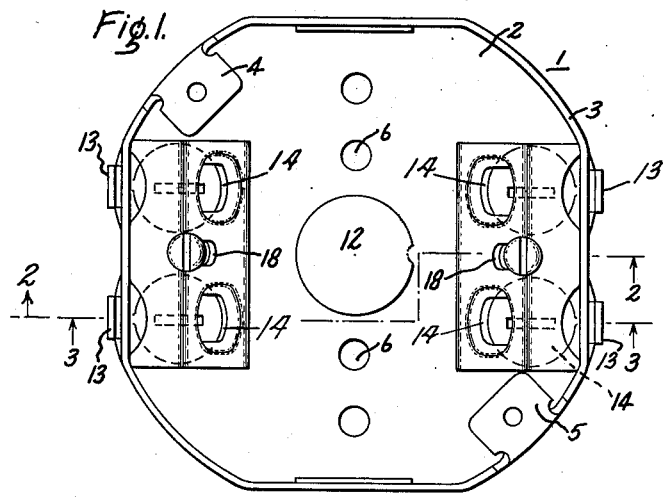
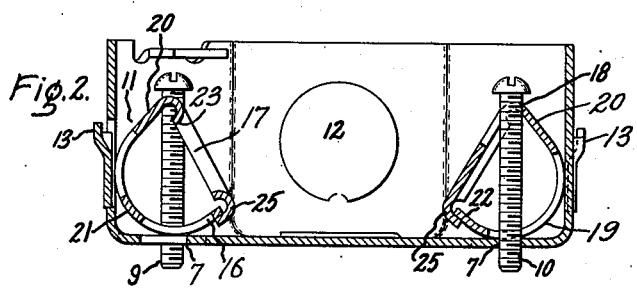
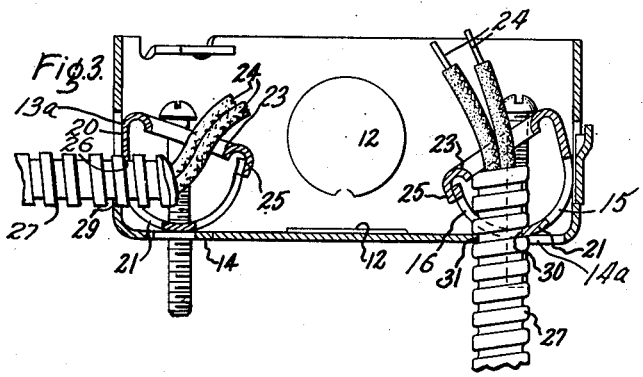
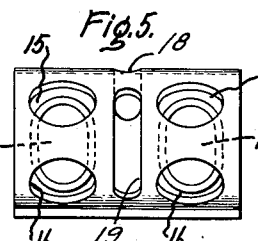
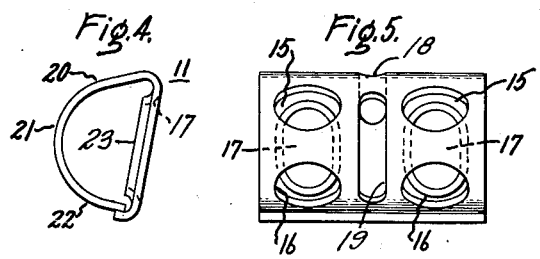
Inventor:
Carl H. Bergquist,
by
His Attorney.

Patented Aug. 10, 1954

2,686,065

UNITED STATES PATENT OFFICE 2,686,065

ARMORED CABLE CLAMP

Carl H. Bergquist, Stratford, Conn., assignor to General Electric Company, a corporation of New York Application February 29, 1952, Serial No. 274,195

4 Claims. (Cl. 285—24.5)

This invention relates to clamps for armored cable and in particular to an armored cable clamp made of sheet metal and particularly adapted to use with electrical outlet and switch boxes.

Electricians use clamps to hold armored cable fixedly in contact with the walls of outlet boxes or switch boxes to prevent tearing conductors loose from terminals and to provide adequate grounding connections. The ordinary clamp presses the armored part of a cable against the bottom or side of an electrical box to hold the cable in place by friction.

In the installation of switch and outlet boxes, hereinafter called boxes or electrical boxes, the electrician sometimes brings armored cable in through a side pry-out (removable aperture closure) and sometimes through a bottom pry-out, depending upon the physical location of the parts. In early prior art clamps, screw holes were tapped in both the side and the bottom of the box and a clamp held by a screw was used to force the cable armor against either the side or the bottom of the box.

The next step in the development of cable clamps was one with which a single screw and screw hole could be used to hold either side or bottom entrance cable, and in this type device a hole was tapped so that its axis was in a plane dividing the angle between the side and bottom of the box.

In such an installation, however, the operation of piercing and tapping the angle hole required two additional operations on the box, thereby increasing its cost. That is, with the angle hole, instead of providing one hole in the bottom of the box which could be pierced when the nail holes in the bottom of the box were pierced and tapped at the same time the cover holding ears on the box were tapped, the box had to be sent through a separate operation for the piercing and tapping of the angle hole.

Accordingly, it is an object of this invention to provide an improved cable clamp which in combination with a single bottom tapped hole can secure either side or bottom entrance cable.

It is a further object of this invention to provide an improved cable clamp for use in securing either bottom or side entrance cable and which has portions adapted to cover cable apertures having pry-outs removed, thereby preventing the leakage of any sparks or arcing in accordance with underwriters requirements.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

In the drawing, Fig. 1 is a top view of the open end of an outlet box; Fig. 2 is a side elevation, partly in section, taken through the plane 2—2 of Fig. 1; Fig. 3 is another view, taken through the plane 3—3 of Fig. 1, showing armored cables positioned in contact with the clamp and the outlet box; Fig. 4 is an end view of the improved cable clamp; while Fig. 5 is a front elevation of the same cable clamp.

Briefly, this invention relates to a tubular cable clamp having a screw clearance hole and an elongated clearance slot on opposite ends of a single diameter. When a screw is driven into a tapped hole in the bottom of an outlet box, the cable clamp rotates to wedge side or bottom entrance cable against a portion of the periphery of the cable entrance aperture. In doing this, a portion of the clamp adjacent the cable partially covers any exposed portions of the entrance aperture.

Referring to the drawing, an outlet box 1 is shown made of sheet metal. The box is deep drawn to have a bottom wall 2 and side walls 3, the latter of which conventionally has an octagonal shaped periphery. A pair of ears 4, 5 are formed on the sides of the outlet box and each ear is drilled and tapped to accommodate screws for holding a box cover (not shown) in place.

The bottom of the box is pierced to form nail or securing holes 6 through which nails may be driven to hold the box against a stud and the bottom is further pierced and tapped to form a pair of tapped openings 7 for accommodating screws 9, 10 which are used to hold cable clamps 11 in contact with the box.

The box has knock-out plugs 12, side pry-outs 13, and bottom pry-outs 14 which cover cable entrance apertures. The knock-out openings are used to admit an armored cable clamp of a type passed through the box wall in bushinglike fashion to be held in place by a nut, while the pry-out openings 13a and 14a are used to admit armored cable which is held in the box by means of internal cable clamps, such as the new clamp 11.

Clamp 11 is formed from a flat piece of sheet metal which is stamped and then rolled to form a tubular member having generally the cross-sectional shape of a half-circle.

In the clamp stamping operation, holes 15 are formed having a diameter to accommodate side entrance armored cable and holes 16 are formed having a diameter to accommodate bottom entrance armored cable. Conductor slots 17 are formed in the chordal portion of the clamp to act as stops and limit the extent of insertion of armored cable through holes 15, 16; i. e., they are of such a diameter that the armored cable cannot pass through them, but the individual insulated conductors can pass through them.

To provide for securing the clamp in the outlet box, a slightly elongated clearance hole 18 and an elongated slot 19 are formed on opposite ends of an approximate diameter of clamp 11. The clearance hole 18 is positioned at the intersection of a tangential surface 20 of the clamp and the chordal portion, while the slot 19 is formed in both the curved surface 21 and the tangential surface 22 substantially opposite the clearance hole 18. The elongated slot 19 has substantially the same width as the diameter of the clearance hole 18, and accordingly when a screw 9 is passed through the clearance hole 18 and through slot 19 the clamp 11 can rotate about a longitudinal axis positioned at the intersection of the clearance hole 18 and screw 9 whereby the sides of slot 19 move transversely to the axis of screw 9.

The conductor openings 17 in the chordal portion are so formed that a lip 23 is positioned on the periphery of each of the conductor openings 17 to prevent the abrading of the insulation on the portion of the insulated conductor 24 passing through the conductor opening 17.

After the slots and apertures thus described have been formed in the clamp blank, it is rolled into its tubular form and held in shape by rolling one edge 25 of the chordal portion over a contiguous edge of tangential portion 22.

To provide for mounting each such clamp is an electrical box, a single hole 7 is pierced and tapped in the bottom of the box near one side thereof. As screw 9 is passed through the clearance hole 18 and through the slot 19 to be threaded into hole 7, the clamp is rotated by the pressure of the screw head on the clamp whereby the sides defining slot 19 move transversely to the axis of screw 9 so that, in effect, the clamp rotates about the longitudinal axis passing through the intersection of the axes of screw 9 and clearance hole 18.

Accordingly, with my improved cable clamp, the electrician first decides whether or not the cable should be brought into the box through a side pry-out opening 13a or bottom pry-out opening 14a. The selected pry-out is then removed from the box and the cable having a portion of the armor adjacent one end stripped away to expose insulated conductors 24 is brought in, for example, through the pry-out opening shown in the left-hand side of Fig. 3 and through a clamp opening 15. The conductors 24 are then threaded through a conductor opening 17 in the chordal portion. Screw 9 is then tightened into the threaded aperture 7 to force the curved surface 21 of the clamp to move counterclockwise about the longitudinal axis through the intersection of clearance hole 18 and screw 9 whereby a peripheral surface 26 of one of the holes 15 engages the cable 27 to squeeze its armor against a bottom peripheral shoulder surface 29 of the pry-out opening. This clamping action between the peripheral edge 26 and the shoulder 29 securely locks the cable armor from further movement and insures a good electrical grounding connection between the armor and the box.

The conductors 24 usually are threaded through the conductor opening 17 simultaneously with the insertion of the cable through the pry-out opening. These openings 17, which lie in the chordal portion, are substantially at a 45° angle with the longitudinal axis of the cable 27 at its point of entrance into the box. This relative positioning of the parts is very convenient for electricians since the conductors are thus brought into the box without making sharp bends in them.

It should be noted further that the chordal portion reduces the size of the cable clamp 11, thereby increasing the amount of operating space within the outlet box 1.

In the second illustration (Fig. 3), cable 27 is brought through a bottom pry-out opening 14a and screw 10 is tightened to rotate the curved surface 21 of the clamp along the bottom of the outlet box until the peripheral surface 30 in one of the bottom entrance holes 16 engages the cable 27 to drive it against a peripheral shoulder 31 of the bottom pry-out opening to effect a locking action on cable 27. Once again the conductors are brought through conductor holes 17 that lie in a plane substantially at a 45° angle with the axis of the cable at its point of entrance, and once again the electrician does not have to bend the conductors 24 through any severe angle to lead them into the operating portion of the box connection.

It has been pointed out that the clamp has a surface 20 tangentially disposed with respect to the curved portion 21. This structure serves the purpose of covering the exposed portions of the side entrance apertures 13a. When the pry-outs 13, 14 close entrance apertures large enough to accommodate the larger sizes of armored cable. When smaller diameter cables are used, it follows that a portion of the cable aperture normally is open. The Underwriters' Laboratories, Inc. requires, however, that these openings be covered to prevent the leakage of sparks or arcing from the box. Accordingly, the tangential surface 20 slides somewhat contiguous with the box walls as the clamp is rotated to overlie the open portion of the aperture and thereby meet underwriters' requirements. If the portion 20 were a continuation of the curved surface 21, there would not be effective aperture coverage. If either the portion 20 or 22 were at an angle greater than tangential with the curved surface 21, they would interfere with the clamp rotation and with the clamping action. In the case of bottom cable entrance through a bottom opening 14a, the intermediate clamp portion 21 also partially closes the exposed portion of the bottom aperture.

Modifications of this invention will occur to those skilled in the art and it is desired to be understood, therefore, that this invention is not intended to be limited to that particular embodiment described but rather is it intended to cover all modifications which are within the true spirit and scope of this invention.

What I claim as new and desire to secure by Letters Patent of the United States is:

1. An armored cable clamp comprising a strip of metal formed as a tube having generally the cross-sectional shape of a half-circle and defining a curved portion and a chordal portion, said strip having armor entrance holes in the curved portion of the tube and cooperating conductor-receiving apertures lying in the chordal portion, said strip further having a transverse elongated clearance hole in the chordal portion adjacent an edge joining the chordal portion with the curved portion, and an opening in the curved portion to provide for the securance of said clamp to an electrical box.

2. An armored cable clamp comprising a strip of sheet metal formed as a tube having generally the cross-sectional shape of a half-circle and defining a curved portion and a chordal portion, said strip having at least one pair of opposed armor entrance holes in said curved portion of the tube to admit a portion of armored cable, and a conductor-receiving aperture in said chordal portion for each of said one or more pairs of armor entrance holes, the conductor-receiving apertures having a diameter small enough to prevent the entrance of the armor therein but large enough to receive the insulated conductors therethrough, said strip further having a transverse elongated clearance hole in the chordal portion adjacent an edge joining the chordal portion with the curved portion and an opening in the curved portion to provide for the securance of said clamp to an electrical box.

3. In an electrical box having side and bottom walls defining cable entrance apertures with said bottom wall having a threaded bore therein, a cable clamp including a single screw for securing said clamp in said bore to hold either side or bottom-entering armored cable, said clamp comprising a strip of metal formed as a tube and defining a curved portion and a chordal portion, said strip having opposed armor entrance holes in the curved portion of the tube and cooperating conductor-receiving apertures lying in the chordal portion substantially at 45° with the axes through each of said armor entrance holes, the said conductor-receiving apertures being of a size smaller than the armor entrance holes to receive the insulated conductors of the cable, said strip further having a transverse elongated clearance hole in the chordal portion adjacent an edge joining the chordal portion with the curved portion, and an opening in the curved portion through which the said screw extends.

4. In an electric outlet box having side and bottom walls provided with pry-outs adapted for opening the box to either side or bottom-entering cable, said bottom wall having a threaded bore therein, a cable clamp including a single screw for securing said clamp to said box for holding the end of either a side or a bottom-entering cable, said clamp comprising a strip of metal formed as a tube having generally the cross-sectional shape of a half-circle and defining a curved portion and a chordal portion, said strip having two pairs of armor entrance holes in the curved portion of the tube, each pair consisting of opposed holes, and a single complemental conductor-receiving aperture for each of said pairs of armor entrance holes, both of said conductor-receiving apertures lying in the chordal portion and each being substantially at 45° from the axes through each of said armor entrance holes which constitute the adjacent pair, said strip further having a transverse elongated clearance hole in the chordal portion adjacent an edge joining the chordal portion with the curved portion, and an opening in the curved portion to receive the said screw means.

References Cited in the file of this patent

UNITED STATES PATENTS

| Number | Name | Date |
|---|---|---|
| 1,778,624 | Carlson | Oct. 14, 1930 |
| 1,974,268 | Givens | Sept. 18, 1934 |
| 2,480,522 | Tornblom | Aug. 30, 1949 |